Jan. 29, 1952 S. R. OLDHAM ET AL 2,583,664
RELIEF VALVE
Filed June 9, 1945
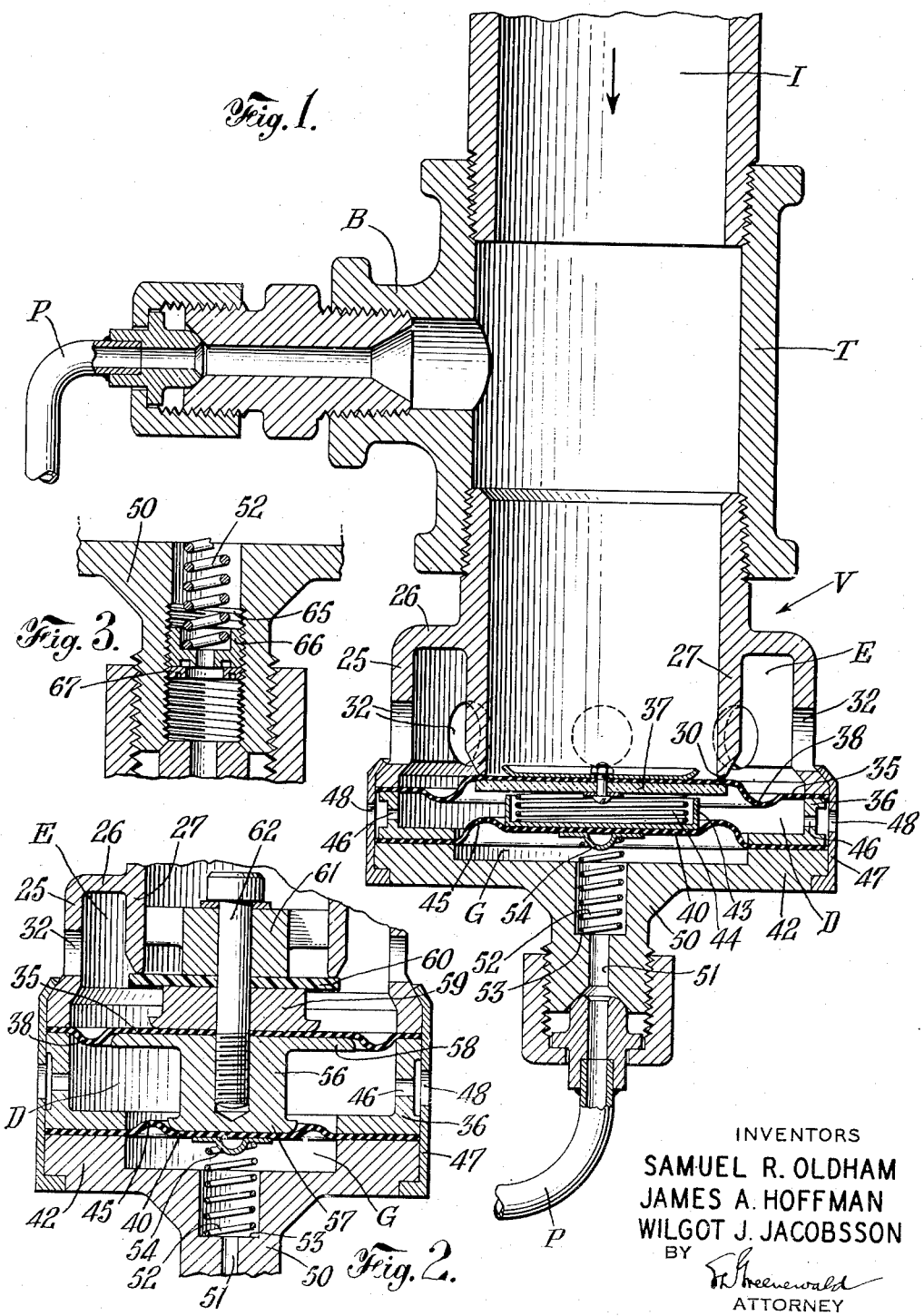
INVENTORS
SAMUEL R. OLDHAM
JAMES A. HOFFMAN
WILGOT J. JACOBSSON
BY
ATTORNEY Patented Jan. 29, 1952

2,583,664

UNITED STATES PATENT OFFICE 2,583,664

RELIEF VALVE

Samuel R. Oldham, West Orange, James A. Hoffman, Roselle, and Wilgot J. Jacobsson, Plainfield, N. J., assignors, by mesne assignments, to Union Carbide and Carbon Corporation, a corporation of New York Application June 9, 1945, Serial No. 598,584

11 Claims. (Cl. 137—53)

This invention relates to relief valves, and more particularly to valves adapted to open automatically at a predetermined fluid pressure within a vessel or system, so as to protect the latter against any damage due to excessive pressure. The invention has a wide field of use for tanks, pipe lines, or even pressure regulators, in which it is desired to maintain the pressure therein below a predetermined maximum.

Safety relief valves generally consist of a valve having an area exposed to the fluid pressure in the system to be controlled, and a spring having a loading equal to the force exerted on the valve by the pressure at a predetermined maximum value. When the predetermined pressure is high, and/or the valve area is large, stronger opposition is required, with consequent heavier and larger springs.

It is therefore the main object of the present invention to reduce the size of spring required for a given valve opening pressure and a given valve area. This is accomplished by subjecting an area of the valve or an area of a pressure responsive element operatively connected to the valve to the pressure in the system to be controlled, leaving only a differential pressure to be resisted by the spring.

Other objects and features of novelty will be apparent as the following description proceeds, with reference to the accompanying drawings, in which, Fig. 1 is a detailed cross-section through a safety valve according to the preferred embodiment of the present invention which is shown by way of example; and Fig. 2 is a view of a fragment of Fig. 1, showing a modification; and Fig. 3 is a similar view showing a further modification.

In Fig. 1 there is shown a fluid inlet I which may be connected to a pipe line, tank, pressure regulator, or any desired part of a system containing fluid under pressure. The inlet I communicates with a pipe fitting T, another branch of which is connected to a relief valve V. The pipe fitting T has another branch B, which is connected by a pipe P to the opposite side of the relief valve V.

The relief valve V comprises an upper body having an outer concentric wall 25, an upper face 26 and a concentric inner wall 27, which forms an entrance nozzle communicating with the inlet I. This entrance nozzle has a sealing rim 30 of smooth circular shape with a very small radius, in order to give very small contact area with the seat, thereby requiring very slight loading to effect sealing. The nozzle wall 27, upper face 26, and wall 25 define an annular exhaust chamber E, which communicates through several large holes 32 in the outer wall 25, with the outside atmosphere.

A thin flexible diaphragm 35 preferably made of anode or synthetic rubber, of construction suitable to give desired flexing over a wide range of temperature (—70° F. to +150° F.), is clamped at its margin between the lower rim of the outer wall 25 and the upper rim of a spacer ring 36. In addition to the pressure responsive action, the diaphragm 35 serves as a seat sealing gasket for engagement with the nozzle rim 30. A diaphragm plate 37 made of suitable light material as flat as possible, preferably glass, and of a diameter slightly larger than the nozzle rim 30, is attached to the diaphragm 35 on its lower side opposite the rim 30 and centered with respect thereto. The part of the diaphragm 35 between the edge of the plate 37 and the outer margin of the diaphragm is preferably convexed toward the outside or in the pressure direction, forming an annular corrugation 38 to give increased freedom of movement.

A second diaphragm 40 of the same or similar material as the first diaphragm, is marginally clamped between the spacer ring 36 and a base plate or cap 42. The cap 42 is provided with an internal annular recess which cooperates with the diaphragm 40 to form a compensating chamber G. A light metal cup 43 is secured to the upper side of the diaphragm 40 and facing the diaphragm plate 37. The cup 43 receives and guides a coil spring 44 of small gauge and large coil diameter, having a very light load and a very low spring rate, which bears against the diaphragm plate 37. The portion of this diaphragm 40 between the edge of the cup 43 and the spacer ring 36, is preferably convexed in the direction toward the first diaphragm, forming an annular corrugation 45.

The spacer ring 36 is provided with vent holes 46 spaced around its periphery, and a clamping ring or band 47 having corresponding vent holes 48, is crimped or spun over the lower rim of the outer wall 25 and the edge of the cap 42, thereby clamping the body, two diaphragms and spacer ring together in gas-tight relation to form a compact unit. The space between the diaphragms constitutes a vent chamber D, and the vent holes 46 and 48 connect this space with the outside atmosphere.

The cap 42 has a central hollow boss 50 provided with a through axial passage 51 and forming the inlet stem for the relief valve compensating chamber. This stem is connected to the pipe P, which through the branch B connects the inlet I with the inlet pressure side of the compensating diaphragm 40. The central hollow boss 50 houses a small gauge and a small coil diameter spring 52 of light load and low spring rate. The lower end of the spring 52 abuts an internal annular shoulder 53 in the boss 50, and the upper end of this spring 52 contacts and is centered by a guide hump 54 secured to the underside of the second diaphragm 40.

In order to provide the differential pressure desired, the effective compensating diaphragm area must be smaller than the effective nozzle sealing area.

It should be noted that substantially atmospheric pressure is maintained in the chamber D or space between the two diaphragms 35 and 40. Substantially atmospheric pressure also prevails in the annular exhaust chamber E in the body which lies between the walls 25 and 27 and between the wall 26 and diaphragm 35. Hence the size of the effective diaphragm area of the nozzle sealing diaphragm 35, which is outside of the nozzle rim 30, is substantially immaterial. But from a practical standpoint, whatever the size of this outside effective area of the diaphragm 35, this area has the beneficial effect of decreasing the differential exhaust pressure with increasing gas flow and providing a desired degree of blow-down so that the valve will close tightly after pressure is reduced a desired amount.

The desired amount of blow-down is obtained by proportioning the area of the vents 32 with respect to the valve opening area so that a desired small back pressure exists in the chamber E during blow-down.

The operation of the relief valve may be illustrated by considering an example in which the nozzle area (effective sealing area at 30) is conveniently one square inch. The compensating effective diaphragm area of diaphragm 45 may be 0.9 square inch and the spring 52 may provide a sealing load force of one pound. Thus if the pipe P were removed so that no compensating pressure is applied to chamber G, a pressure of only one pound per square inch gauge in the inlet I would be needed to open the valve against the force of spring 52. With pipe P connected as shown to apply compensating pressure to diaphragm 40, and a pressure in the inlet I of say five p. s. i., the diaphragm 40 will furnish a closing force of 5×0.9=4.5 pounds which when added to the spring force provides a total force of 5.5 pounds to hold the valve closed. When the inlet pressure increases to 10 p. s. i., the closing force will be 0.9×10+1=10 pounds and thus the valve will be ready to open at a slight increase of pressure above 10 p. s. i. When the valve once opens it will open wide for a sufficient period to reduce the pressure a desired amount as explained above.

By providing a compensating force that varies according to the inlet pressure, only a small valve closing spring 52 is needed and the valve seat material can be quite soft because it does not need to withstand heavy valve closing forces at any value of the inlet pressure.

As a modification, especially for higher pressures, the metal cup 43 and the spring 44 may be omitted, and a rigid stem provided to transmit the differential pressure from the diaphragm 40 to a separate valve seat above the diaphragm 35, as shown in Fig. 2. This comprises a cylindrical body portion 56 having a flat base 57 contacting the central portion of the diaphragm 40 within the corrugation 45, the rim of the base 57 being rounded to prevent a localized stress condition. The upper end of the stem has a radial flange 58 corresponding to the diaphragm plate 37.

Above the diaphragm 35 is mounted a spacer or pedestal 59, which supports a valve seat 60 adapted to engage the rim 30. If desired, a guide 61 may be mounted above the valve seat 60 to engage the wall 27, but this guide is optional, and may be omitted in many installations. A screw 62 passes through registering central apertures in the valve seat 60, spacer pedestal 59 and diaphragm 35 into the stem 56, for clamping these parts tightly together. This screw also passes through the guide 61, if such guide is employed.

As shown in Fig. 3 the spring 52 may be made adjustable so that it is relatively easy to set the valve for a desired range without undue increase in the spring load. This adjustment also serves the purpose of reducing the effect of variations in spring length, as received from the spring manufacturer.

In the form shown the shoulder 53 is omitted, and the main bore is threaded as at 65, to receive a headless screw 66 having a central aperture for the passage of fluid. When the screw 66 has been turned to set the spring 52 to the desired pressure, the centrally apertured locking ring 67 is applied to prevent turning of the adjusting screw due to vibration or other cause.

What is claimed is:

1. A relief valve casing having an inlet, an outlet, a valve seat therebetween, valve means for controlling the flow of fluid through said valve seat, and means for closing said valve against the pressure of fluid in said inlet and comprising a pressure responsive device having a compensating element movable relatively to said valve and provided with a pressure responsive area less than the area of said valve seat, and a continuously open conduit in intercommunicating relation between said inlet and said pressure responsive device whereby said pressure responsive element is uninterruptedly connected to receive a compensating pressure continuously from said fluid pressure system and provide a compensating force acting to partly compensate the force of fluid against said valve from the inlet, and resilient means within said casing providing a force acting additively to the compensating force for providing a valve closing force equal to the valve opening force of a predetermined inlet pressure.

2. A relief valve casing having a nozzle for communication with a source of fluid under pressure, diaphragm means for closing said nozzle against such pressure, a compensating element having a compensating pressure responsive area, and a continuously open conduit in intercommunicating relation between said source and said compensating pressure responsive area for applying fluid pressure from said source to said diaphragm means to partially compensate the fluid pressure against said diaphragm means through said nozzle, the effective nozzle sealing area being greater than the effective compensating diaphragm area, and means within said casing and engaging said diaphragm means for completing such compensation.

3. A relief valve casing comprising a nozzle, an inlet leading to said nozzle, a diaphragm for closing said nozzle against the pressure in said inlet, a second diaphragm, a continuously open conduit in intercommunicating relation between said inlet and said second diaphragm for continuously applying compensating pressure from said inlet to only said second diaphragm, and resilient means for transmitting the force of said compensating pressure from said second diaphragm to the first diaphragm.

4. A relief valve having a nozzle for communication with a system, a valve for closing said nozzle, diaphragm means for actuating said valve, said diaphragm means having a compensating pressure responsive area, and a continuously open conduit in intercommunicating relation between said pressure system and said compensating pressure responsive area for applying pressure from said nozzle to said diaphragm means to partially compensate for the nozzle pressure tending to open said valve, and valve closing spring means having a loading substantially equal to the difference between the valve opening force and the force of said partially compensating pressure.

5. A relief valve having a nozzle for communication with a system, a valve for closing said nozzle, diaphragm means for actuating said valve, means for applying pressure from said nozzle to an effective area of said diaphragm means smaller than the area of said nozzle, and a valve closing spring having a loading substantially equal to the difference between the valve opening force of said diaphragm means and the partially compensating force of the pressure on said smaller effective area.

6. A relief valve having an inlet, a nozzle communicating with said inlet, diaphragm means for closing said nozzle, means cooperating with said nozzle and diaphragm for forming an annular exhaust chamber surrounding said nozzle and in communication with the atmosphere, a second diaphragm having an effective compensating area smaller than the area of said nozzle, means for securing the margins of said diaphragms in spaced relation, a continuously open conduit in intercommunicating relation between said inlet and said effective compensating area of said diaphragm for continuously applying compensating pressure from said inlet to said second diaphragm, and means for venting the space between said diaphragms to the atmosphere.

7. A relief valve comprising a nozzle, a diaphragm having a central area for closing said nozzle, a second diaphragm, means for maintaining the margins of said diaphragms in spaced relation, means for venting the space between said diaphragms, said second diaphragm having an effective area smaller than said valve closing area, means for applying pressure from said nozzle to said second diaphragm area, valve closing spring means having a loading smaller than the valve opening force and means for transmitting the force of the pressure on said second diaphragm area and the force of said valve closing spring means to said first mentioned diaphragm.

8. A relief valve comprising an outer wall, an annular face, and a central nozzle, a diaphragm having a central area closing said nozzle and an annular area cooperating with said outer wall and annular face and central nozzle to form an exhaust chamber, a second diaphragm, means for maintaining the margins of said diaphragms in spaced relation, a diaphragm plate between said diaphragms and secured to the first diaphragm in position underlying said nozzle, a cup between said diaphragms and secured to the second diaphragm, a valve closing spring in said cup between said plate and said second diaphragm, a cap marginally engaging said second diaphragm and having a chamber therein and an inlet pipe connected to said nozzle, a spring in said chamber and engaging said second diaphragm, and means for clamping said outer wall, diaphragms, spacing means, and cap together to form a compact unit.

9. A relief valve comprising a casing having an inlet, an outlet, a valve seat therebetween, valve means for controlling the flow of gas through said valve seat, a diaphragm closing said valve against gas pressure in said inlet, a second diaphragm having an effective compensating area smaller than said valve seat, a continuously open conduit in intercommunicating relation between said inlet and said effective compensating area of said second diaphragm for applying gas pressure from the system to compensate for the gas pressure against said valve from said inlet, said first diaphragm being mounted between said second diaphragm and said valve opening, and said compensating pressure being applied to the side of said second diaphragm away from said valve.

10. A relief valve comprising a casing having an inlet, an outlet, a valve seat therebetween, a valve cooperating with said valve seat for controlling the flow of gas through said valve seat, a diaphragm cooperating with said valve for forcing said valve against said valve seat for closing said valve against pressure in said inlet, a second diaphragm, a spacer ring between the margins of said diaphragms, a cap marginally engaging said second diaphragm and having a chamber therein and an inlet connected to said first mentioned inlet, a spring in said chamber and engaging said second diaphragm, means for transmitting force from said second diaphragm to said first diaphragm, and means for clamping the margins of said cap, diaphragms and spacer together to form a compact unit.

11. A relief valve comprising a casing having an inlet, an outlet, a valve seat therebetween, valve means for controlling the flow of gas through said valve seat, a diaphragm for closing said valve against gas pressure in said inlet, a second diaphragm, a diaphragm plate secured to the side of the first diaphragm toward the second, a cup secured to the side of the second diaphragm toward the first, a valve closing spring in said cup and engaging said diaphragm plate, and means for applying gas pressure from the inlet to the side of said second diaphragm away from said valve to compensate for the gas pressure against said valve from said inlet.

SAMUEL R. OLDHAM.
JAMES A. HOFFMAN.
WILGOT J. JACOBSSON.

REFERENCES CITED

The following references are of record in the file of this patent:

UNITED STATES PATENTS

| Number | Name | Date |
|---|---|---|
| 291,013 | Richardson | Dec. 25, 1883 |
| 1,172,739 | Roehrich | Feb. 22, 1916 |
| 1,753,529 | Oliphant | Apr. 8, 1930 |
| 2,071,152 | Work | Feb. 16, 1937 |

FOREIGN PATENTS

| Number | Country | Date |
|---|---|---|
| 16,836 | Great Britain | Aug. 22, 1901 |
| 39,309 | Denmark | Sept. 19, 1928 |
| 130,738 | Germany | May 14, 1902 |
| 528,010 | Great Britain | Oct. 21, 1940 |